United States Patent [19]

d'Arcy et al.

[11] 4,359,071
[45] Nov. 16, 1982

[54] AUTOMATIC WATER REFILLING OF STORAGE BATTERIES

[75] Inventors: Rainer-Lionel d'Arcy, Iserlohn-Letmathe; Hartmut Schmidt, Gevelsberg, both of Fed. Rep. of Germany

[73] Assignee: Varta Batterie Aktiengesellschaft, Hanover, Fed. Rep. of Germany

[21] Appl. No.: 136,311

[22] Filed: Apr. 1, 1980

[30] Foreign Application Priority Data

Apr. 2, 1979 [DE] Fed. Rep. of Germany ....... 2913191

[51] Int. Cl.³ ............................................. B65B 3/36
[52] U.S. Cl. ..................................... 141/1; 141/102; 222/644
[58] Field of Search ...................... 137/624.13, 624.15; 141/192, 237, 238, 242, 243, 1, 102, 5; 222/14–22, 76, 70

[56] References Cited

U.S. PATENT DOCUMENTS 3,800,794  4/1974  Georgi .................................. 222/76

Primary Examiner—Frederick R. Schmidt
Attorney, Agent, or Firm—Weiser, Stapler & Spivak

[57] ABSTRACT

The individual cells of a storage battery have water refill plugs which contain valves actuated by floats and which are connected to a common water supply conduit. In the water supply conduit there is a valve which is repeatedly actuated in pulse-like manner during refilling. This actuation occurs after the gassing potential of the battery has been reached and about 1.5–2 hours before termination of charging. The valve is actuated during a period of 5–10 minutes in impulse-like manner for 5–10 seconds at a time, separated by pauses of 5–10 seconds each.

8 Claims, 4 Drawing Figures

AUTOMATIC WATER REFILLING OF STORAGE BATTERIES

The invention relates to a method of automatically replenishing the water in storage batteries having individual cells respectively provided with water refill plugs containing valves actuated by floats, and which are connected to a common water supply conduit. The invention also relates to apparatus for practicing the method.

In multi-cell storage batteries, and particularly in traction batteries, increasing use is being made of automatic water refill systems. These consist, essentially, of a water refill plug in each individual cell which meters the electrolyte level by means of a float, and in which the valve for water supply is closed by means of a float. Such water refill plugs must have a high degree of operating reliability. It is particularly desirable that the valve body actuated by the float be pressed into its valve seat through the pressure of the liquid column in the supply, so that the closure is produced by the pressure of the inflowing water. A valve of this type is, for example, disclosed in German Utility Model Gebrauchsmuster No. 74 40 002.

The individual cells equipped with such valves are connected with each other by a common water refill conduit. This water supply conduit contains a valve through which the water supply is controlled during the charging process. This control may, for example, be provided in known manner by the charging equipment itself. In addition, there is in the water supply conduit, a water storage container and a device for removing salts from the water (a water softener). Despite the high operating reliability of the water refill plugs described above, there can occur, particularly in multi-cell storage batteries, sticking of an individual valve so that this individual cell does not receive adequate water refill quantities.

Accordingly, it is an object of the present invention to provide a method and an apparatus by means of which absolutely reliable refilling of all the cells is assured, and in which, in particular, defects due to the hang-up or sticking of individual valves in the water refill plug are precluded.

These and other objects of the invention are achieved by causing the supply valve positioned in the water supply conduit to be actuated repeatedly in impulse-like manner during the refill process.

For further details, reference is made to the discussion which follows in light of the accompanying drawings wherein FIG. 1 is an overall diagrammatic illustration of an apparatus embodying the present invention;

Figure 1:
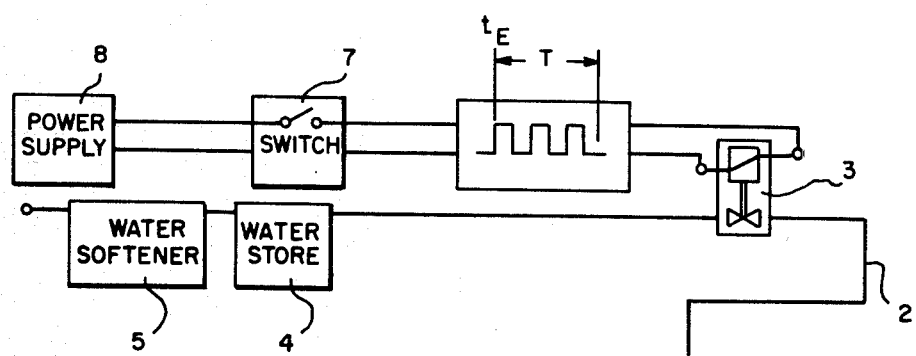
Figure 1:
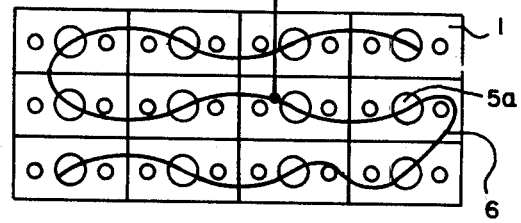

Referring to FIG. 1, there is shown a storage battery consisting of a plurality of individual cells 1 and connected to a water refill system which consists of water supply conduit 2, a valve 3 connected in this supply conduit, a water storage container 4 and, if desired, a water softener 5. All the water refill plugs 5a are connected to each other by the common water supply conduit 6.

In addition to the water refill arrangements, the individual cells have the customary cell terminals which make it possible to connect the individual cells in series or in parallel. The actual electrical connection of the cells, however, is not further illustrated.

In accordance with the invention, during charging the valve 3 is actuated repeatedly in impulse-like fashion during the water refill process. For this actuation there is utilized a switch 7 which is connected to a power supply 8 and which controls the magnetic valve 3. By means of this switch 7 there is caused impulse-like actuation during a period T. This period T is normally between 5 and 10 minutes in duration and each switch-on pulse has a duration of about 5–10 seconds, while the closed interval also is of the order of magnitude of 5–10 seconds.

This periodic on and off switching can be produced after actuation of switch 7 by a conventional switching relay. Due to the intermittent opening and closing of valve 3, the refill water likewise flows intermittently in the supply system 6 to the battery and thereby to the individual water refill plugs 5a.

This water flowing into the refill system in impulse-like manner is uniformly distributed and the pulsation of inflowing water occurring with the above-mentioned frequency insures trouble-free operation of the water refill plugs having floats. During each pause there is reached an equilibrium condition in the system. As the valve 3 connected in the water supply conduit, there may, for example, be used a magnetic valve. Of course, pneumatic or hydraulically actuated valves can also be used. If desired, a valve can also be used which opens and closes of its own accord, actuated by the water flow itself.

Figure 2:
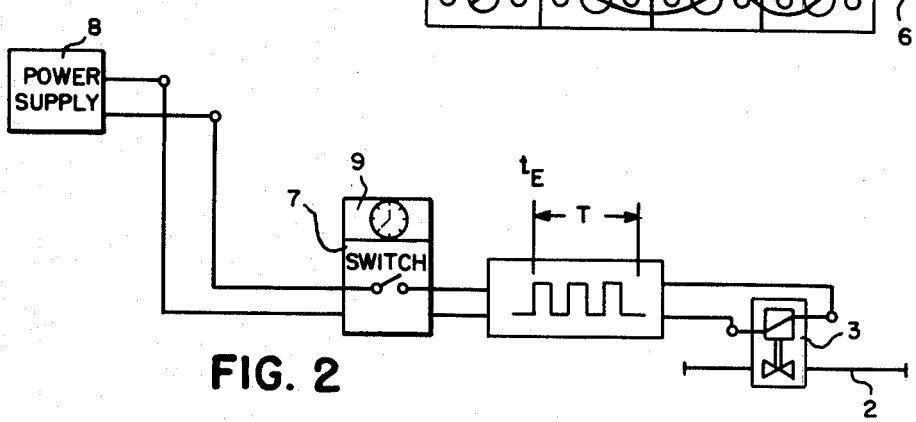
FIG. 2 illustrates diagrammatically another embodiment of certain specific elements of the invention.
Figure 3:
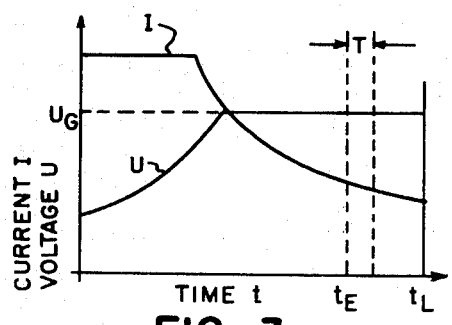
FIGS. 3 and 4 are graphic illustrations of the variations as a function of time which take place in the refill process, and their control in relation to the changing characteristics of the storage batteries.

As shown in FIG. 2, a clock timer 9 can be added to switch 7. The starting time for the water resupply process during the charging can be preset with such a clock timer. The actuation of the water refill process desirably takes place before termination of charging, that is, during a period of about 1.5 to 2 hours before termination of charging, but after reaching a gassing potential of 2.4v per cell. This is illustrated in principle in the diagram of FIG. 3, which shows the variation of charging current I and charging voltage U as a function of time t. As can be seen from this figure, the water refill process starts at the time $t_E$ to which clock timer 9 has been preset. During the period T, there then takes place the impulse-like actuation of the valve 3 positioned in water supply conduit 2. The time $t_E$ is about 1.5 to 2 hours before the termination of charging $t_L$. The time $t_E$ is always later than the occurrence of the gassing potential and is determined empirically depending upon the particular charging method utilized. If there is utilized in I U I a characteristic (charging with constant current, constant voltage, and again with constant current and automatic shutoff) then this point in time occurs, for example, about 5 to 5.5 hours after the beginning of charging, that is, about 1.5 to 2 hours before the termination of charging.

The time at which the water refilling takes place can also be determined by a potential relay, which senses the battery potential and actuates switch 7, for example, at a battery voltage of about 2.45 to 2.50 volts, that is about 1 hour after the gassing potential has been reached in a conventional charging process. The potential relay then takes the place of the clock timer 9 in FIG. 2.

Figure 4:
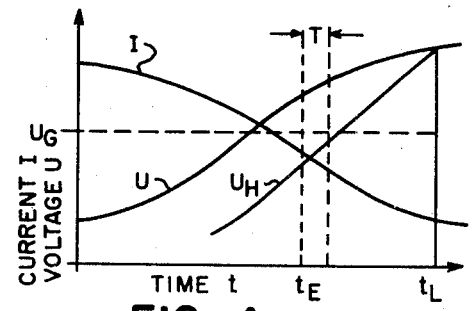

In addition, the time for the start of the water refilling can also be determined by a charging control switch, or rather by the charging equipment itself. To this end, there may be used a charging control switch, by means of which the battery potential is continuously sensed as it varies with time. The characteristics of such charging equipment are shown in FIG. 4. In order to determine when the fully charged state has been reached, which is indicated by a dwelling of the potential U above the gassing potential $U_G$, the battery potential is compared with a reference potential $U_H$ which varies with time and which follows the battery voltage. This reference potential remains parallel to the battery potential as long as the displacement controlled reference potential has the same rate of increase as that of the battery potential itself. If the rate of increase of the battery potential changes due to increasing charging, then the reference potential follows while maintaining the predetermined displacement. This continues until following with constant displacement becomes impossible due to differing rates of increase. The reference potential then continues to increase at its fixedly predetermined rate. As a result, after a predetermined period of time, there automatically occurs a cross-over of battery potential and reference potential. The signal which is produced by this cross-over is utilized to terminate the charging at time $t_L$. The voltage and current curves which characterize such a charge process are shown in the diagram of FIG. 4 as a function of time. In this, the gassing potential (2.4v) is designated as $U_G$, the reference potential which follows the cell potential as $U_H$. Termination of charging takes place upon cross-over of the battery potential U and reference potential $U_H$ at time $t_L$. The water refill process begins at a time $t_E$ which follows the attainment of the gassing potential and is determined by the fact that the difference between the battery potential U and the reference potential $U_H$ has reached a predetermined value. This difference potential value is also determined empirically, so that the water refilling process takes place about 1.5 to 2 hours before the termination of charging. At that time, the battery has practically reached its terminal charge potential, which ordinarilly equals about 2.65 volts.

In lieu of the charge control switch described above, which is controlled by the battery potential, there can also be used charge control switches in appropriately modified manner, which are controlled by the battery current. Starting at the time $t_E$ which is so determined, the refill process embodying the invention then takes place for a period T.

In case several storage batteries of the type shown illustratively in FIG. 1 are to be filled from a common water storage container, the switched magnetic valves which are respectively connected in the water supply conduits of the individual batteries can be actuated one after the other by a stepping switch system. As a result, there takes place an impulse-like operation for each individual valve in the water supply conduit to a single battery.

The water refill technique described above also makes it possible to also perform water refilling method with high reliability for multi-cell storage batteries and insures that all the cells have substantially the same electrolyte filling state.

We claim:

1. A method for automatically refilling with water storage battery having individual cells which are respectively provided with water refill plugs containing float-actuated valves and which are connected to a common water supply conduit, said method comprising
    actuating an additional valve provided in the common water supply conduit repeatedly in impulse-like manner during the refilling process whereby stitching of said float actuated valves in said water refill plugs in precluded.

2. The method of claim 1 wherein
    the valve provided in the common water supply conduit is actuated repeatedly in impulse-like manner after the gassing potential of the storage battery has been reached and during a predetermined period of time before the charging process is terminated.

3. The method of claim 1 wherein
    the valve provided in the common water supply conduit is actuated in impulse-like manner during the charging process for a period of 5–10 minutes with on-times of 5–10 seconds each, alternating with pauses of 5–10 seconds each.

4. Apparatus for practicing the method of claim 1, said apparatus comprising
    a valve positioned in the common water supply conduit of the storage battery, and switching means for activating said valve repeatedly in impulse-like manner.

5. The apparatus of claim 4 further comprising sundry means for controlling the switching means is controllable by a timer means.

6. The apparatus of claim 4 further comprising charging control switching means for controlling the valve actuating switching means.

7. The apparatus of claim 4 wherein the switching means is a stepping switch which controls a plurality of valves in succession in predetermined sequence.

8. The apparatus of claim 4 wherein the valve in the water supply conduit is a magnetic valve.

* * * * *